July 23, 1935.   R. W. BROWN   2,008,678
CUTTING EDGE TESTER
Filed Oct. 23, 1931   3 Sheets-Sheet 2
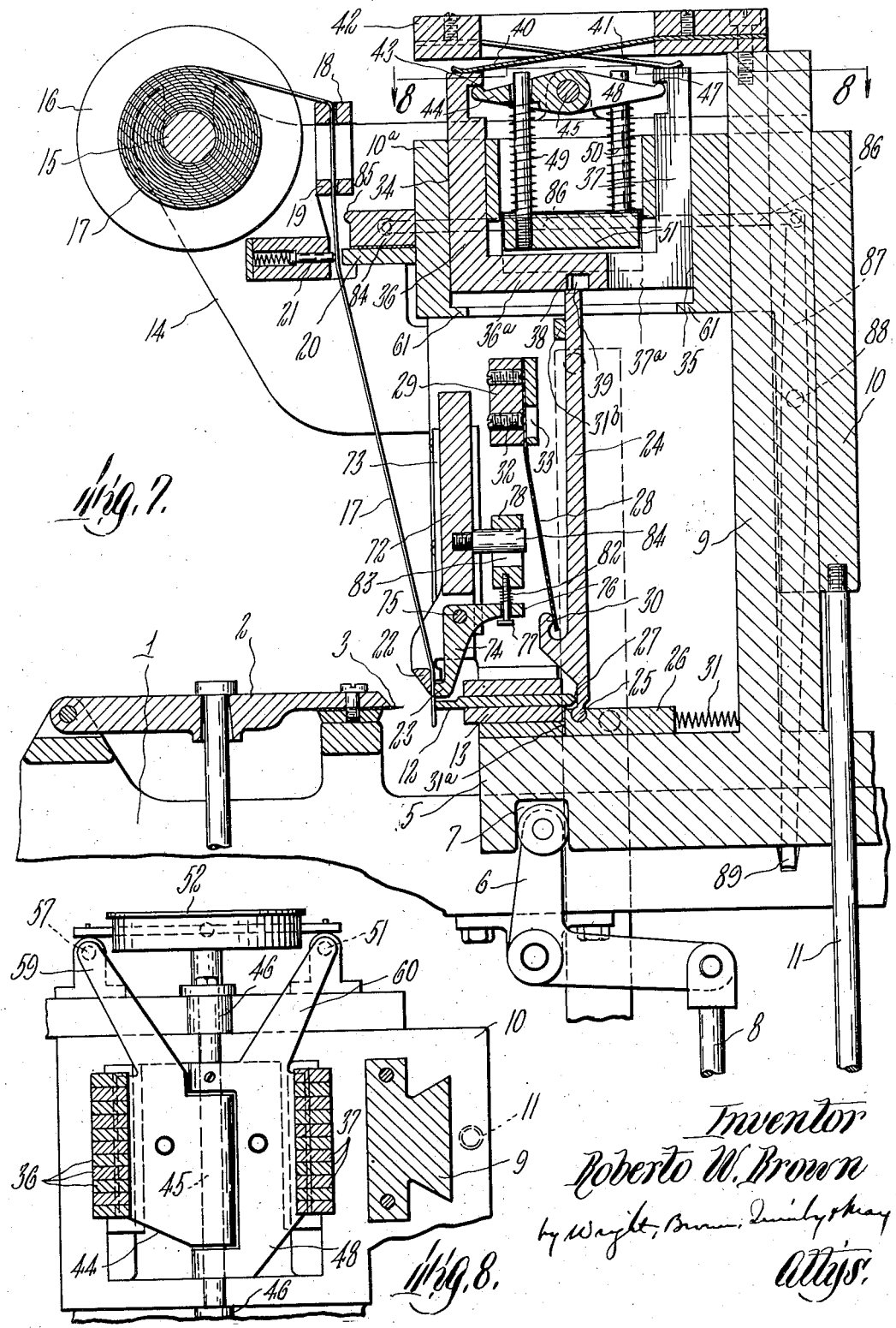
Inventor
Roberto W. Brown July 23, 1935. R. W. BROWN 2,008,678
CUTTING EDGE TESTER
Filed Oct. 23, 1931 3 Sheets-Sheet 3

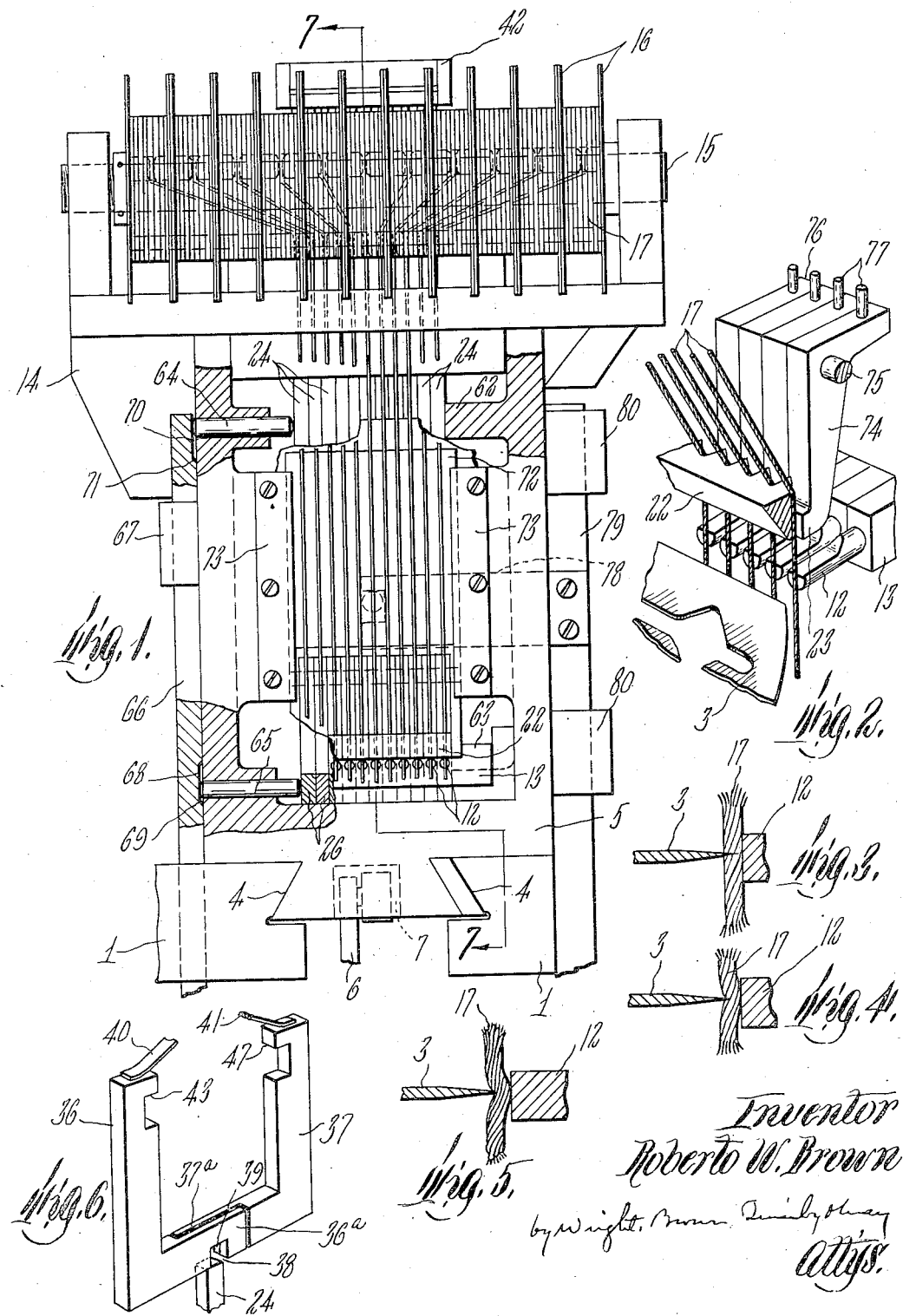

Inventor
Roberto W. Brown

Patented July 23, 1935

2,008,678

UNITED STATES PATENT OFFICE 2,008,678

CUTTING EDGE TESTER

Roberto W. Brown, Boston, Mass.

Application October 23, 1931, Serial No. 570,672

16 Claims. (Cl. 73—51)

The object of the present invention is to provide a reliable testing device for the cutting edges of blades of which a high quality of keenness is required, and adapted to determine and indicate whether or not a blade is sufficiently sharp, and preferably also to discriminate between degrees of dullness as to blades which are not up to the prescribed standard of keenness. The blades for which such a device is most needed are those produced for safety razors, wherefore I have devised the form of the invention here illustrated, particularly for that use, and will generally refer to it as a blade tester; but of course without intending to indicate any limitations as to its field of use or the cutting implements which may be tested with its aid, whether in the form here shown or in other embodiments containing the same principles.

In substance the principle according to which the invention works is the movement or lack of movement given to an indicator by pressure exerted through the blade being tested when applied edgewise against an interposed mass or body of material which is capable of being readily penetrated by a sharp blade but not by a dull one. A sufficiently sharp blade enters the body without imparting movement to the indicator, while a blade too dull to cut the material transmits pressure and motion to the indicator through the full range, and blades of intermediate quality partially cut the substance and partially transmit movement to the indicator. A substance is used for the interposed body of such slight hardness that it may be cut without injury to the keen edge, while being firm and hard enough to transmit motion to the indicating mechanism when the blade applied is insufficiently sharp for cutting.

In giving the specific illustration of the invention which follows in this specification I have shown only the parts which are concerned purely with testing or feeling the blade edge and making an indication according to the quality of the edge, omitting illustration of extraneous parts such as supporting frame and primary moving elements, which may be provided in various suitable forms by skilled machine designers, and the details of which are immaterial to the invention. It is to be understood also that the essential elements of the invention may be embodied in other forms and details than those here illustrated.

In the drawings,—

Fig. 1 is a front elevation, with parts broken away and shown in section, of a blade edge tester embodying the invention;

Fig. 2 is a fragmentary perspective view of what may be termed the feeler element of the machine, in operative relationship to a razor blade being tested;

Figs. 3, 4 and 5 are diagrammatic views showing the action in the tester of blades of different qualities, i. e., a satisfactorily sharp blade, a medium sharp blade, and a blade too dull to be acceptable, respectively;

Fig. 6 is a perspective view showing two associated elements of the indicator means;

Fig. 7 is a vertical section of the machine taken on line 7—7 of Fig. 1;

Fig. 8 is a horizontal section taken on line 8—8 of Fig. 7;

Like reference characters designate the same parts wherever they occur in all the figures.

Figure 9:
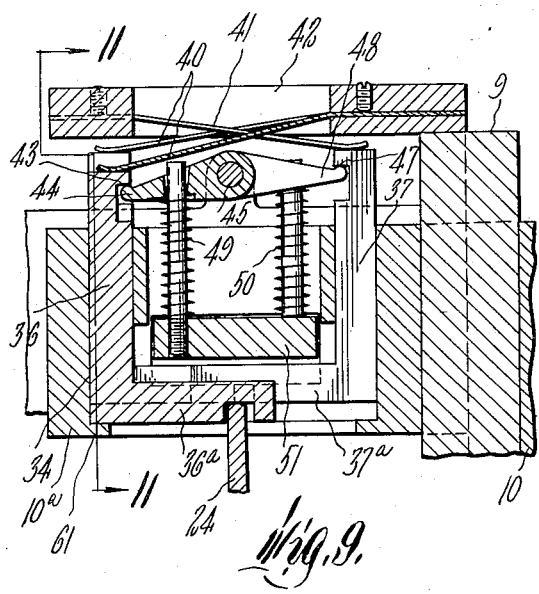
Figs. 9 and 10 are vertical sections corresponding to the upper part of Fig. 7, showing the parts which effect the desired indications in different positions as affected by a medium sharp blade and a dull blade, respectively.

In this illustration 1 represents part of a stationary frame on which there is mounted a blade holder 2 having suitable clamping means for securing and suitably positioning a razor blade 3 to be tested. The frame has a guideway 4 supporting and guiding a carriage 5 which is movable horizontally toward and away from the blade holder, and is adapted to be so moved by any suitable means, here typified by a bell crank lever 6, one arm of which enters a notch 7 in the slide, and the other arm of which is connected to a link 8 which may lead to a primary mover of any suitable character.

Carriage 5 has an upright guide 9 on which there is mounted to travel vertically a slide or secondary carriage 10, connected to motion producing means of any suitable character, here typified by a rod 11.

Carriage 5 supports a row of rods, pins or bars 12, arranged side by side, parallel to one another and to the line of movement of the carriage, or approximately so, and in the same plane with the blade and its edge. These rods protrude toward the blade from the carriage and are independently movable endwise in passages within holders 13 mounted on the carriage.

On the upper part of the carriage is a frame 14 holding a spindle 15 whereon a number of spools or reels 16, equal in number to the rods 12, are mounted side by side. Each of these spools carries a rolled up thread 17 which passes to and through guides 18, 19, past a draw-off device, later described, to a tension clamp 20—21, and thence to a feed clamp 22—23 which grips it close above one of the rods 12 and from which the depending thread passes across the face of the subjacent rod.

These rods and threads constitute the feeling elements of the machine. The threads provide the bodies which are capable of being cut without sensible transmission of motion by an adequately sharp blade, and of transmitting motion by pressure applied through a dull blade. The movement of the carriage brings them up against the edge of the blade to be tested and causes a relative backward movement of any rod which thus approaches a dull blade, or a dull spot in the blade. For convenience of definition herein the rods may be called displaceable abutments for the respective threads adapted to hold the thread up to the thrust of the blade edge, and to transmit movement if the pressure so applied is greater than that required for cutting the thread by a sharp blade.

I have provided a number of abutment rods and threads in order to test a blade simultaneously at a large number of points. The practical number which I have selected is that of the prongs of a safety razor guard, and I have arranged them to come opposite those parts of the blade edge over which such prongs extend when the blade is placed in the razor; selecting the points under the guard prongs as the parts to be tested because these points are not effective in shaving, wherefore even if they were somewhat dulled in the course of testing, the efficiency of the blade would not be impaired, and because also the immediately adjacent points of the edge, those which are exposed in the spaces between the guard prongs and do the major part of the work in shaving, have the same order of keenness as the point to which the feeling test is applied.

For the threads 17 I may use any of a large variety of commercial sewing threads, made of any of the fibers commonly used, or special threads, yarns or other strands may be provided. I contemplate also using bodies other than spun or twisted fibrous strands. In short, this phase of the invention includes any material which is incisable by blades of different degrees of sharpness under different degrees of pressure, and is capable of being moved bodily and transmitting movement against resistance, when pressed upon by a more or less dull edge. As a practical matter therefore, the strand or body should be firm enough to be displaced bodily, without flattening objectionably under pressure, and to necessitate some pressure for incision even by a sufficiently sharp blade. I have found that commercial sewing threads meet these requirements.

The movement of the abutment rods 12 available to distinguish between sharp, dull and medium sharp blades, is necessarily limited, and preferably it is multiplied in producing the final result. Multiplying levers 24 are provided, one for each of the abutment rods, each having pivotal support at 25 in a fulcrum block 26 and having a point or knife edge bearing with the rear end of the abutment rod at 27, near the fulcrum block. These levers are pressed forward by individual leaf springs 28, all secured to a holder clamp 29 and each bearing on a hook or finger 30 of its respective lever. The fulcrum blocks 26 are individually slidable on the carriage in front to rear directions, and are pressed upon individually by springs 31 which normally hold them against a stop shoulder 31a on the carriage. A stop bar 31b extending across the carriage locates the upper ends of the levers. The tension of springs 28 is regulatable by a screw 32, one for each spring, which bears on the spring opposite to a hole 33 in the holder clamp 29. The reason for making the fulcrum blocks thus movable is to compensate for variations in different blades as to width, straightness and position of the edge, etc., in order that in the making of a test all of the feeler abutments and threads may first be pressed equally against the edge of any blade; and the blocks are so freely movable and springs 31 so light as to permit displacement by even a sharp blade under pressure less than enough to cause cutting of the threads thereby.

The slide or secondary carriage 10 has a forwardly projecting structure 10a in which is a space providing guideways 34 and 35 for two sets of slidable bars 36 and 37 respectively. These bars may be called, for convenience of description, selector bars because their function is to discriminate between blades of different qualities of sharpness and effect an indication according to quality. The individual bars of each series are equal in number to the levers 24, and are arranged in pairs, each pair of front and rear bars being in the same vertical plane with one of the levers. Each forward bar 36 has a rearwardly extending foot 36a and each rear bar has a forwardly extending foot 37a, these feet overlapping and being diminished in thickness at their overlapping parts, where they pass across the end of the intermediately subjacent lever 24, as shown best in Fig. 6. The foot 36a has a notch 38, wider than the end of lever 24, but out of register therewith so that its forward lower corner normally overlaps the forward upper corner of the lever; and the foot 37a has a similar notch 39 slightly to the rear of notch 38, so that its forward side still further overlaps the lever. The arrangement is such that, if the lever is swung a certain short distance to the rear, it will register with notch 38, but without coming into full register with notch 39; and when moved a certain distance further it will come into register with the latter notch while remaining in register with notch 38. Each of the bars 36 is pressed upon by a light leaf spring 40, as well as by gravity, toward the underlying lever, and each bar 37 is similarly pressed upon by a leaf spring 41, all of these springs being secured to a frame 42 which projects from the upright 9 over the part 10a of the secondary carriage.

The forward selector bars 36 are notched at the rear side near the upper end to provide shoulders 43 alined with one another which overlap and bear upon the edge part of a plate 44 which is adapted to turn about a horizontal pin 45 supported in lugs 46 on the upper frame part of the main carriage. The rear bars are oppositely notched to provide shoulders 47 overlapping and bearing on a plate 48 which is held rotatably by the same pin 45 and extends oppositely to the the plate 44. These plates are independently pressed upon upwardly by springs 49 and 50, respectively, which rest and react on an abutment block 51 which is a part of the main carriage independent of the secondary carriage.

Figure 12:
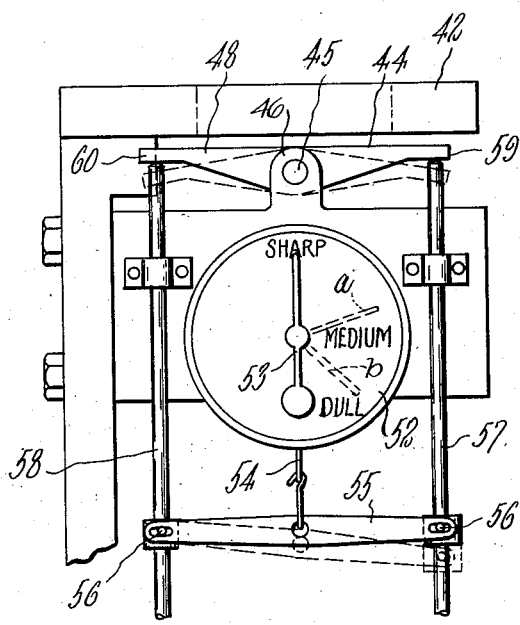
Fig. 12 is a front elevation of an ultimate indicator which may be used with the apparatus here shown for showing directly the discrimination between sharp, dull and intermediate blades.
Figure 11:
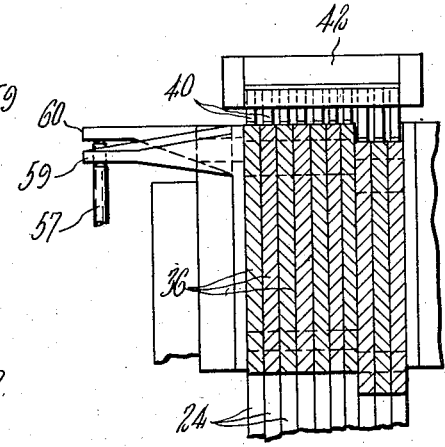
Fig. 11 is a cross section on line 11—11 of Fig. 9.

Plates 44 and 48 are elements which cause an indication to be given of the character of the blade being tested. Any one of a wide variety of ultimate indicators capable of showing this characteristic, either exclusively or in conjunction with other effects, may be used. I have shown here for purposes of illustration, but not of limitation, a dial indicator 52 (Fig. 12) of well known character, having a pointer or hand 53 which is adapted to be moved when a draw bar 54 is moved downward. The interior mechanism of this indicator is unimportant for the present invention. It is sufficient for this description to explain that downward movement of the draw bar turns the pointer in clockwise rotation against the resistance of a spring (which normally raises the draw bar and holds it up), through an angle proportional to the movement of the draw bar. I have provided here for moving the pointer from zero position, shown in full lines, to either a position $a$ or a position $b$ (shown in broken lines), according as either plate 44 or both plates 44 and 48 are moved downward by descent of a sufficient number of selector bars 36, or of pairs of bars 36 and 37. To this end the draw bar 54 is linked to the center of an equalizing bar 55, the other ends of which are coupled by pin and slot connections 56 with slide rods 57 and 58 respectively, mounted in guides of any suitable character on the main carriage. Plate 44 is provided with an extension 59 which overlaps the end of rod 57, and plate 48 with an extension 60 overlapping rod 58. Thus if both plates are moved downward at the same time, the equalizing bar is displaced bodily and the pointer 53 is turned through its full range, to position $b$; while if the plate 44 alone is moved, the equalizing bar is shifted at one end only and the pointer turned through half its possible range, to position $a$.

On the secondary carriage 10 are shoulders 61 underlying the bars 36 and 37. Normally the carriage is raised from the position shown in Fig. 7 far enough to support the bars by means of said shoulders clear of the levers 24, so that the levers are left free to be moved without any impedance due to friction of the overlying members. In the course of a test, the carriage 10 is lowered far enough to permit descent of those bars with the notches of which any of the levers 24 have been brought into register. The bars above any levers which have not been so displaced will then be supported by the underlying levers before having been lowered appreciably, or far enough to have any indicating effect.

I have provided a series of feeler bodies and abutments, and selector bars, in order that virtually all the effective points of the blade edge may be tested. I may arrange the action so that if any one of these points is insufficiently sharp, an indication will be made, but I have preferred to prevent the making of an indication unless the blade is dull at three or more points, because a blade which is adequately sharp at all but two of the indicated points will serve well enough for shaving. Therefore I make the spring 49 strong enough to support the blade 44 and two of the selector bars 36, plus the pressure of their springs 40, but not the weight and spring loading of any more than two of these bars; and the spring 50 has equivalent strength with respect to the plate 48 and the bars 37. Thus if the blade is dull at any three of the feeler points, the indicator will be operated. But the total number of feeling points, and the fraction thereof necessary to cause an indication may be varied from the present showing in a wide range without departing from the invention.

Figure 10:
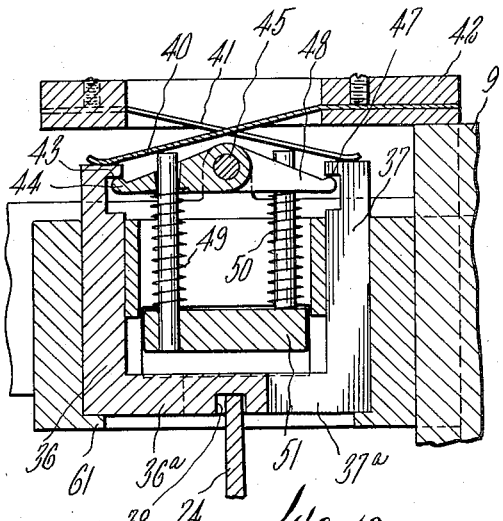

The operation of the machine as thus far described is as follows:—A blade to be tested is mounted in the holder 2 when the main carriage is in the position shown in Fig. 7, but the secondary carriage 10 is raised far enough to lift all the selector bars clear of the levers 24. The main carriage is first advanced toward the blade far enough to bring all of the feeler threads into engagement with all points of the edge of a blade of minimum width for which the machine is adjusted. If the blade is of greater than minimum width, or any points of its edge project more than the minimum distance from the blade holder, corresponding feeler abutments will be arrested before the carriage stops, and will be relatively moved rearwardly of the carriage, moving the corresponding fulcrum blocks to the rear. This movement occurs under such light pressure that the threads are not cut by the blade. Then the fulcrum blocks are locked against further movement, by means later described, and the carriage is advanced an additional distance far enough to cause rearward displacement of levers 24 into full register with the notches 39 if the blade does not cut into the threads, but not enough to bring the feeler abutments into actual contact with a part of the edge which is sharp enough to cut through the thread. Practically, therefore, this second increment of movement is limited to somewhat less than the diameter of the threads. Thereupon the multiplying levers are locked, as later described, and the secondary carriage is lowered to the position shown in Figs. 7, 9 and 10. If the blade is sufficiently sharp at all of the feeling points, it will cut into the strands, substantially as shown in Fig. 3, without displacing any of the abutment rods, or at least without displacing them far enough to cause release of any of the selector bars. But if the blade is so dull at any point that it will not cut the strand which crosses that point, it will transmit pressure by means of the strand to the adjacent abutment rod, as shown in Fig. 5, and displace the latter rearward relatively to the carriage, moving the associated lever 24 far enough to register with both notches 38 and 39 in the associated pair of selector rods. If such a condition of dullness exists at a sufficient number of feeling points, enough of the bars will be thereby deprived of support to drop and turn both plates 44 and 48 about their common pivot, as shown by Fig. 10, and cause the indicator pointer to move to position $b$, (Fig. 12), which shows that the blade is too dull to be marketed. Such a blade may need to be put again through the processes of grinding or honing and stropping.

It may happen that a blade is not dull enough to require complete resharpening, and it may be put into good condition by stropping alone. Such a blade under the limited pressure applied by the spring 28 may be capable of cutting partially into the strand, but not so deeply and cleanly as the adequately sharp blade. Its greater resistance to penetration causes it to displace the strand and abutment somewhat, as shown in Fig. 4, but not so far as the dull blade shown in Fig. 5. When such displacement at a sufficient number of feeling points moves the related levers 24 so that they register with the notches 38 in a prescribed number of feeler bars 36, such bars will drop and turn plate 44, while plate 48 remains unaffected, as shown in Fig. 9. Then the indicator pointer is turned to the intermediate position a, and shows that the edge being tested, while not quite up to standard, is nearly sharp enough. After the test has been made, the secondary carriage is raised so that its shoulders 61 restore the selector bars to their previous positions, allowing the supporting levers to spring back into the supporting position shown by Fig. 7.

I have designed the supporting levers and their fulcrum blocks so that they are free to move under the influence of their springs to the positions previously indicated, and have provided locking means to hold them in their displaced position at proper times. Hence the levers and blocks are placed side by side and are flanked on one side by rigid stationary abutments 62, 63, on the frame, and on the other side by slidable pressure abutments 64 and 65 which extend through guideways in the frame. The outer ends of these pressure abutments protrude from the frame toward a cam bar 66 which is movable endwise in suitable guideways of the frame, one of which guideways is shown at 67 in Fig. 1. Such cam bar has a recess 68 flanked by an inclined cam or wedge surface 69 adjacent to bar 65, and a recess 70 ending in a cam or wedge surface 71 adjacent to abutment 64. These recesses allow recession of the abutment slides far enough to leave the levers and their fulcrum blocks perfectly free to slide past one another. The cam bar is raised by any suitable means in such timed relation to the movement of the main carriage that its wedge 69 first crowds the abutment slide into locking pressure engagement with the outermost abutment block 26, thereby crowding said blocks together and against the fixed abutment 63; and thereafter, when the carriage has completed its movement, the cam surface 71 crowds the slide 64 into similar pressure locking relation to the levers 24, holding them fixed until the selector bars have acted.

The feeler strands are advanced after each test so as to place a fresh uncut portion opposite to the blade next to be tested. Feed clamps 22, 23 perform this function. Clamp member 22 is a bar carried by a vertically slidable plate 72 held on the frame by guides 73 and having an open space for passage of the strands (Figs. 1 and 7). The complemental clamp members 23 are formed on or carried by separate levers 74, one for each strand, pivoted in the open space of slide 72 by a pivot rod 75. These levers are bell cranks, each having a rearward arm 76 through which passes a headed pin 77 secured to a bar 78 which extends laterally through an opening in the side of the carriage from an operating slide 79 which is movable in guides 80 on the carriage and may be moved up and down by any suitable means. Between the bar 78 and the lever arms 76 are springs 82 which normally press the clamp extremities of these levers against the complemental clamp member 22, the heads of pins 77 being displaced from said lever arms far enough for this purpose. In the bar 78 is an opening 83 which receives a stud 84 on the back of the feed slide 72 with a space for greater lost motion than that between lever arms 76 and the heads of pins 77. In feeding the strands onward, slide 79 is raised, which first causes the lever clamps to be retracted from clamp 22, and then, when the lost motion at 83 is taken up, raises the feed slide. Operating slide 79 is then lowered and causes the clamp levers first to be pressed against the strands in a new position, by means of springs 82, and then causes the feed slide and clamps to be moved bodily to the first position with entrainment of the strands. Feed slide 72 is engaged by its guides with sufficient friction to hold it in raised position until lowered by the operating slide.

This action takes place in conjunction with the tension clamp and a draw-off device, and in timed relation with the coaction of the blade and feeler abutments. Member 20 of the tension clamp is a bar or plate which is movable on a part of the main carriage, conveniently the bracket arms 14 which support the spools 16. It has a limited motion between stops, one of which may be the adjacent forward side of the part 10a of the secondary carriage. The complemental clamp member 21 is a spring pressed plunger, one for each thread, mounted slidingly in a rigid support, shown in cross section in Fig. 7, which extends between the bracket arms 14 and may serve as the other stop for clamp bar 20. A draw-off bar 84, having a projecting nose 85 which bears on the threads, is supported on the clamp 20 and is adapted to slide in forward and rear directions thereon, and the frictional engagement of which therewith propels the clamp 20 through the distance permitted by the limit stops of the latter. Bar 84 is coupled by means of links 86 with levers 87, pivoted on the main carriage at 88, and having an engagement at 89 with the main frame. There may be two of these levers and links, one at each side of the carriage and coupled with the opposite ends of the draw-off bar.

As the main carriage moves forward these levers advance the draw-off bar relatively to the carriage, carrying the clamp 20 to its forward limit, where it causes the threads to be gripped by the plunger clamps 21, and thereafter the draw-off bar is further advanced. The clamps hold the threads firmly enough so that this further movement of the draw-off bar causes the threads to be drawn from the spools, which turn readily and offer little resistance. In the course of the action last described, the feeler plungers bring the threads up against the blade. The feed clamps 23 are not released from the thread and raised until after the thread has been caught between the blade and feeler abutments 12, and the fulcrum blocks 26 and levers 24 have been locked by means of the cam 66. After the feed clamps have been raised to their limit of motion, they are not moved downward again until the main carriage has backed off and the tension clamp 20 released by withdrawal of the draw-off bar.

Thus the feed clamps have only the duty of limiting the amount by which the threads are advanced at each step and of maintaining the threads in correct relation to the feeler abutments. The threads are relaxed and slacked when these clamps grasp and propel them onward. Thereby the clamps are enabled to perform their function with a very light pressure on the threads.

I contemplate substituting for the headed pins 77 other equivalent means for coupling the clamp levers with the bar 78 so as to provide for a lost motion. These pins are in effect hooks extending from the bar 78 and underlying the levers. Hooks of other design and mode of connection with the bar may be provided within the scope of the invention.

The foregoing is a complete description of the principles of the invention for which I here seek protection; but I wish to make it distinctly understood that these principles may be embodied in many forms more or less different from that here shown, and combined with accessories of various sorts. For example, it is part of my contemplation to cause automatic placement of the blades in the testing machine and to cause automatic delivery of tested blades to different depositories according to their conditions as determined by the test, under control of the selector elements of the machine. But the delivery to different destinations is in itself an indication of sharpness or dullness of the blades and is typified in a generic way by the simple indicator here shown. Hence the term "indicate", and corresponding terms, as used in this specification with reference to the qualities of blades disclosed by the machine, are used in the broadest sense to include whatever discrimination may be made between edges of different qualities of sharpness.

Discrimination of a high degree of delicacy is possible by the means here disclosed, because the contact of the blade with the feeler bodies is made by direct pressure in lines perpendicular to the edge, and without any drawing or sliding of the blade across the feeler bodies.

Feasible and well known methods of precision manufacture make possible the construction of the delicate parts of the mechanism with such accuracy of dimensions and perfection of surface finish as to insure their operation in the manner described, when manufactured in commercial quantities.

What I claim and desire to secure by Letters Patent is:

1. A cutting blade tester comprising a row of feeler abutments parallel to one another in the same plane and each being movable independently in such plane in parallel paths, means for effecting relative approach through a distance less than the thickness of the after mentioned substance, of said abutments toward the blade to be tested, an incisable substance placed across the ends of said abutments to be pressed upon by the edge of a blade being tested when brought into close proximity to the ends of said abutments, said incisable substance being penetrable by a relatively sharp blade and displaceable by a relatively dull blade, a series of motion multiplying devices each associated with one of said abutments and movable by displacement thereof, a series of selectors each normally restrained from movement in a given direction by one of said motion multiplying devices and releasable by consequence of motion imparted thereto, indicating means, and means whereby the motion of a prescribed number of said selectors following release thereof may operate said indicating means.

2. A cutting blade edge tester comprising a series of abutments arranged side by side, and independently movable in parallel paths in a plane, with end faces, transverse to such plane, opposite to the edge of a blade to be tested, bodies incisable to different depths by blades of different sharpness separately crossing the end faces of the several abutments, means for effecting a relative approach between said abutments and the edge of the blade to a proximity less than the diameter of said bodies, whereby those abutments opposite to dull parts of the blade are displaced by pressure transmitted through the threads, while those opposite to sharp parts are displaced less or not at all, means for indicating a quality of dullness of the blade, and means whereby a prescribed number of said abutments, when thus displaced, operate said indicating means.

3. A blade edge tester comprising an endwise displaceable abutment, a thread extending across an end face of said abutment adapted to be pressed upon by the edge of a blade being tested, and to transmit motion to the abutment under the pressure of a dull blade or to be penetrated without substantial displacement by a sharp blade, means for effecting relative motion apt for such transmission, between the blade and abutment, a multiplying lever having a short arm engaged with said abutment to be moved by displacement thereof and having also a longer arm, a selector bar mounted movably but normally arrested by the long lever arm whereby it is prevented from movement, and adapted to be released by displacement of said long arm, and indicating means operable by said selector when moved in consequence of such release.

4. A blade edge tester comprising a series of endwise movable bars side by side and each under pressure tending to move it independently of the others, pivoted levers each having an arm extending into motion obstructing contact with one of said bars and being displaceable so as to release its associated bar and permit movement thereof, a series of abutments each engaged with one of said levers and movably mounted to transmit motion to its lever in the direction for releasing the bar which is associated with said lever, said abutments having pressure receiving faces side by side in alinement parallel to the edge of a blade to be tested, threads extending across the pressure receiving faces of the several abutments adapted to be pressed upon by a blade being tested and to be penetrated by a relatively sharp edge or displaced by a relatively dull blade with transmission of motion to the associated abutment, means for effecting relative approach between the series of abutments and the blade to a proximity short of actual contact but less than the thickness of the threads, indicator means, and means whereby such movement of a given number of said selector bars actuates said indicator means.

5. A cutting blade edge tester comprising selector bars arranged in two series, with the bars of each series side by side and corresponding bars of the two series formed with overlapping foot portions, a support underlying the foot portions of each pair of bars, one bar of each pair having a notch normally out of register with said support and adapted to be registered therewith by displacement of the support to a certain distance, and the other bar of the pair having a notch further out of register with the support and adapted to be registered therewith by movement of the support to a further distance in the same direction, said bars being adapted to move independently of each other and tending so to move in the direction toward the support, a row of abutments side by side, each movable endwise in motion transmitting engagement with one of the supports and adapted to displace the associated support into register with one or both of the notches of a pair of bars according to the movement given to the abutment, a thread located between the end face of each abutment and the adjacent edge, and means for transmitting varying degrees of movement to said abutments according to the relative keenness or dullness of the blade.

6. In a blade tester as set forth in claim 5, the further combination of indicating means, and means whereby the described displacement of a given number of selector bars of one series operates said indicating means to one degree, and movement of a given number of bars of both series operates the indicating means to a different degree.

7. In a machine of the character described, a plurality of abutments, means for effecting relative approaching movement between said abutments and the edge of a blade to be tested, multiplying levers engaged by the several abutments, independently movable fulcrum members for the several levers, adapted to be displaced by preliminary pressure exerted from the blade against the abutments, and means for locking said fulcrum members against movement.

8. In a machine of the character described, the combination with a feeler thread and means for supporting said thread to receive the thrust of a cutting edge being tested, of means for feeding new points of the thread into position for feeling action, and mechanism for supporting and actuating said feeding means.

9. In a blade edge testing machine having a holder for the blade to be tested, a feeler abutment, a thread crossing said abutment, in position to be pressed against the edge of the blade and to be pressed upon thereby, a feed clamp, means for operating the same to grasp and feed the thread step by step across the engagement location of the blade, and draw-off means cooperating with said feed clamp for preliminarily creating a slack in the thread between the source of supply and the clamp.

10. A cutting edge tester comprising a body capable of being cut without substantial displacement by a sharp edge under direct pressure, and of being incised to a less depth and further displaced, under equal pressure, by less sharp blades; means for supporting said body in contact with the edge to be tested; means for effecting relative movement in the direction for incision, through a distance less than the thickness of said body, between the edged article being tested and the body, from a position where the edge of such article is in contact with the body, whereby a displacement of the body dependent on the degree of sharpness of such edge is effected, and means for giving different indications in accordance with different degrees of such displacement.

11. A testing machine as set forth in claim 10, in which the body-supporting means comprises an abutment for said incisable body at the opposite side thereof from the edge being tested, a carriage for said abutment movable toward and away from the edge being tested and with respect to which the abutment is relatively movable in the same direction, and means by which such relative movement of the abutment operates the said indicating means.

12. A machine for testing the sharpness of a cutting blade comprising a blade holder, a body capable of being incised to different depths by blade edges of different degrees of sharpness under equal pressure, means for exerting a limited pressure between said body and the blade in a manner permitting displacement of the body relatively to such pressure exerting means by the opposing pressure of a dull blade, and means whereby such displacement of the body effects a characteristic indication.

13. A machine for testing the sharpness of a cutting blade, comprising a blade holder, a body adapted to be cut to different depths by blade edges of different degrees of sharpness under equal applications of pressure, means for exerting a limited pressure between said body and the blade, means preventing relative movement between the body and the blade in any other direction than substantially perpendicular to the blade edge, and indicating means organized to show the extent to which the body is displaced, relatively to such pressure exerting means, by the resistance of a blade edge.

14. A blade edge testing machine comprising the combination with supporting structure of a blade holder supported thereby, an incisable body, a movable abutment for said body at the side thereof opposite to the blade, which abutment is movable both with and relatively to the holding means for the body in directions toward and away from the blade, and means for effecting a limited movement between the blade and said abutment in a direction tending to cause penetration of the body by the blade edge but through a distance less than the thickness of the body, whereby the body and abutment are displaced more or less relatively to the holding means according as the blade edge is more or less sharp.

15. A blade edge tester comprising an incisable body, holding means for said body, holding means for the blade, means for relatively moving said respective holding means toward one another in such fashion that the blade edge is brought to bear against the incisable body and to exert pressure thereon tending to displace the body, the body being so displaced more or less according to the dullness or sharpness respectively of the blade.

16. A blade edge tester comprising an incisable body, holding means for said body, holding means for the blade, means for relatively moving said respective holding means toward one another in such fashion that the blade edge is brought to bear against the incisable body and to exert pressure thereon tending to displace the body, the body being so displaced more or less according to the dullness or sharpness respectively of the blade, and means operated by such displacement for giving an indication of sharpness of the blade.

ROBERTO W. BROWN.